US006816121B1

(12) United States Patent
Cheng et al.

(10) Patent No.: US 6,816,121 B1
(45) Date of Patent: Nov. 9, 2004

(54) MOTORIZED ROTATABLE WIRELESS ANTENNA

(75) Inventors: Chieh-Yuan Cheng, Tao-Yuan (TW); Cheng Yao, Taipei (TW); Chang-Hung Lee, Yun-Lin Hsien (TW)

(73) Assignee: BenQ Corporation, Tao-Yuan Hsien (TW)

( * ) Notice: Subject to any disclaimer, the term of this patent is extended or adjusted under 35 U.S.C. 154(b) by 0 days.

(21) Appl. No.: 10/463,662

(22) Filed: Jun. 18, 2003

(51) Int. Cl.[7] .............................. H01Q 1/24; H04B 1/00

(52) U.S. Cl. ...................... 343/702; 343/757; 455/575.7

(58) Field of Search .................................. 343/702, 757, 343/880–882; 455/556.1, 575.7, 90.3, 347; 361/683, 684

(56) References Cited

U.S. PATENT DOCUMENTS 5,644,320 A * 7/1997 Rossi ......................... 343/702
5,949,379 A * 9/1999 Yang .......................... 343/702

* cited by examiner

*Primary Examiner*—Michael C. Wilmer
(74) *Attorney, Agent, or Firm*—Winston Hsu

(57) ABSTRACT

A wireless communication device includes a housing, an antenna, and a transceiver for transmitting and receiving wireless signals through the antenna. The wireless communication device also includes a first hinge connecting the antenna to the housing for allowing the antenna to rotate about a first axis with respect to the housing, a first motor for rotating the antenna about the first axis with respect to the housing, and a control circuit for controlling the first motor to rotate the antenna for scanning reception of wireless signals as the antenna is rotated at different angles.

10 Claims, 14 Drawing Sheets

MOTORIZED ROTATABLE WIRELESS ANTENNA

BACKGROUND OF INVENTION

1. Field of the Invention

The present invention relates to an antenna for a wireless local area network (WLAN), and more specifically, to a wireless antenna that can be rotated by a motor for improving signal reception of the antenna.

2. Description of the Prior Art

In recent years, wireless communication networks have experienced great growth. In addition to mobile phone networks, wireless computer networks are now rapidly gaining in popularity. While cable has traditionally been used for wiring local area networks (LANs), the introduction of the wireless LAN (WLAN) has allowed users to freely carry computing devices around within the area of the WLAN while still being connected to the network.

Please refer to FIG. 1. FIG. 1 is a diagram of a host computer 10 connected to a WLAN according to the prior art. The host computer 10 may be any computing device that is able to connect to a network, such as a notebook computer, desktop computer, or a PDA. The host computer 10 is connected to a wireless communication card 20 for allowing the host computer 10 to communicate with the WLAN. The wireless communication card 20 comprises a housing 22 and an antenna 30 disposed on the housing 22. The housing 22 may be connected to the host computer 10 through a PCMCIA slot, a USB port, etc. The antenna 30 is disposed on the housing 22 in such a way that the antenna 30 is approximately perpendicular to a surface that the host computer 10 is placed on.

Please refer to FIG. 2. FIG. 2 is a functional block diagram of the wireless communication card 20 connected to the host computer 10 according to the prior art. The wireless communication card 20 contains a transceiver 26 electrically connected to the antenna 30 for transmitting and receiving wireless signals through the antenna 30. A signal sensor 28 is electrically connected to the transceiver 26 for detecting strength of wireless signals received by the wireless communication card 20. The signal sensor 28 will output a feedback signal FD to a controller 24 for notifying the controller 24 of the strength of the received wireless signals. According to the strength of the signal detected by the signal sensor 28, the controller 24 will vary the magnitude of a control current $i_c$. For instance, if the signal sensor 28 detects a weak signal, the controller 24 will then increase the magnitude of the control current $i_c$ for increasing the strength of the wireless signals.

Inserting the wireless communication card 20 into the host computer 10 allows the host computer 10 to quickly connect to a WLAN. Unfortunately, the antenna 30 of the wireless communication card 20 is fixed, and cannot be repositioned for improving the strength of wireless signals transmitted and received by the wireless communication card 20.

Please refer to FIG. 3 and FIG. 4. FIG. 3 and FIG. 4 are perspective diagrams of a WLAN stick 40 according to the prior art. The WLAN stick 40 comprises a housing 42 and a connector 44 formed on the housing 42. The connector 44, such as a USB connector, is used for connecting the WLAN stick 40 to a host computer and allowing the host computer to communicate with the WLAN through the WLAN stick 40. The WLAN stick 40 also includes an antenna 50 connected to the housing 42 with a rotatable hinge 48. As shown in FIG. 3, the antenna 50 is rotated outwards from the housing 42 of the WLAN stick 40 for improving the reception of wireless signals. The antenna 50 can also be rotated towards the housing 42 until the antenna 50 rests in a cavity 46 of the housing 42, as shown in FIG. 4. Rotating the antenna 50 along the hinge 48 allows the antenna 50 to positioned at an angle which provides optimum strength of signals transmitted to and received from the WLAN.

Unfortunately, the antenna 50 can only be rotated about one axis, which prevents the antenna 50 from being rotated about other axes for further improving the signal strength. Also, the antenna 50 has to be rotated manually, and a user of the WLAN stick 40 has a hard time knowing exactly what the optimum angle of the antenna 50 is. A trial and error process is usually required, with the user positioning the antenna 50 at a chosen angle, determining if the resulting signal strength is sufficient, and repositioning the antenna 50 if necessary.

SUMMARY OF INVENTION

It is therefore a primary objective of the claimed invention to provide a wireless communication device with a motorized rotatable wireless antenna in order to solve the above-mentioned problems.

According to the claimed invention, a wireless communication device includes a housing, an antenna, and a transceiver for transmitting and receiving wireless signals through the antenna. The wireless communication device also includes a first hinge connecting the antenna to the housing for allowing the antenna to rotate about a first axis with respect to the housing, a first motor for rotating the antenna about the first axis with respect to the housing, and a control circuit for controlling the first motor to rotate the antenna for scanning reception of wireless signals as the antenna is rotated at different angles.

It is an advantage of the claimed invention that the wireless communication device has the first motor for rotating the antenna about the first axis for automatically scanning signal strength when the antenna is positioned at different angles, and for rotating the antenna to an angle that provides best signal strength.

These and other objectives of the claimed invention will no doubt become obvious to those of ordinary skill in the art after reading the following detailed description of the preferred embodiment, which is illustrated in the various figures and drawings.

DETAILED DESCRIPTION

Figure 5:
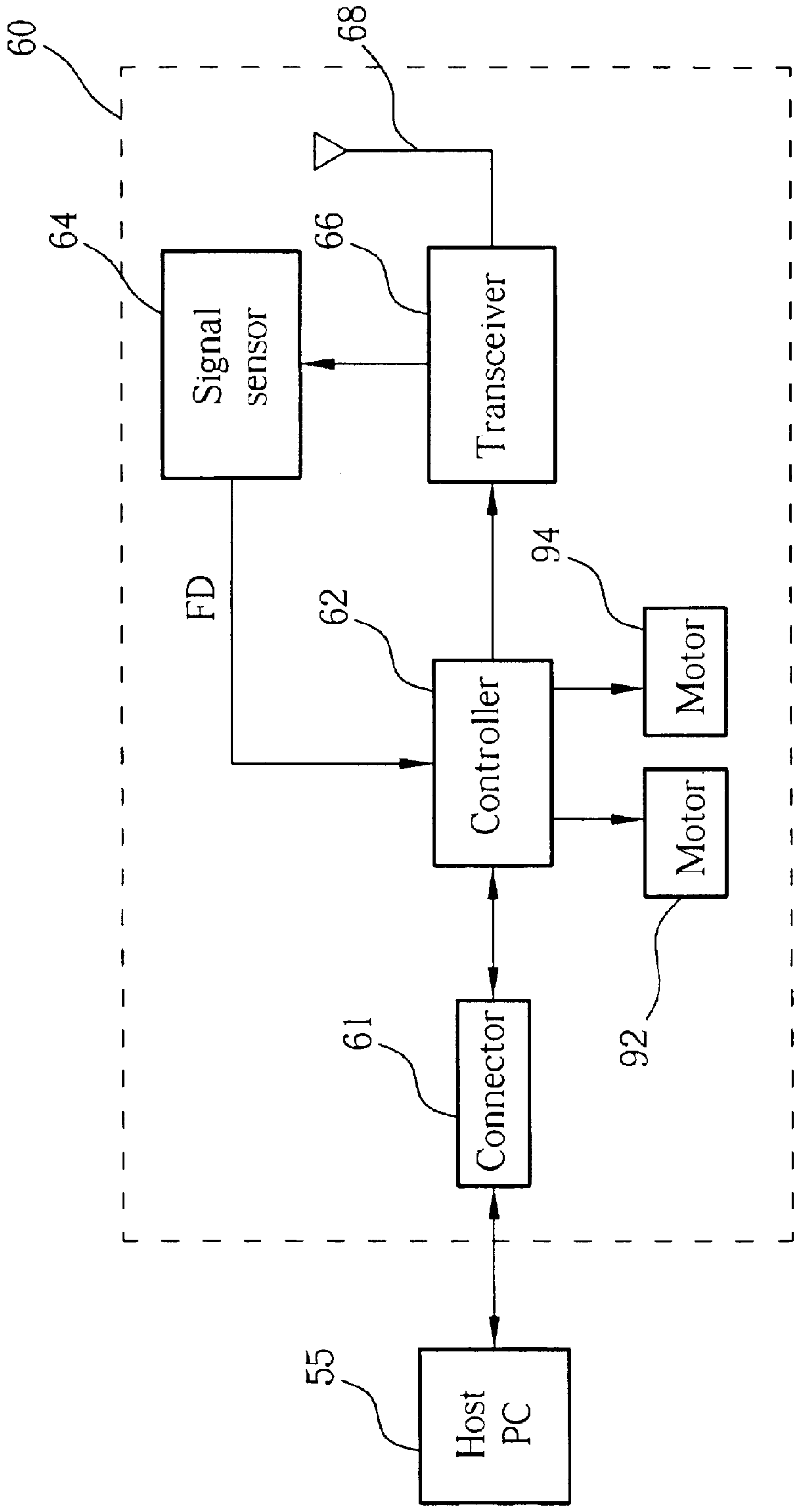
FIG. 5 is a functional block diagram of a WLAN stick connected to a host computer according to the present invention.
Figure 6:
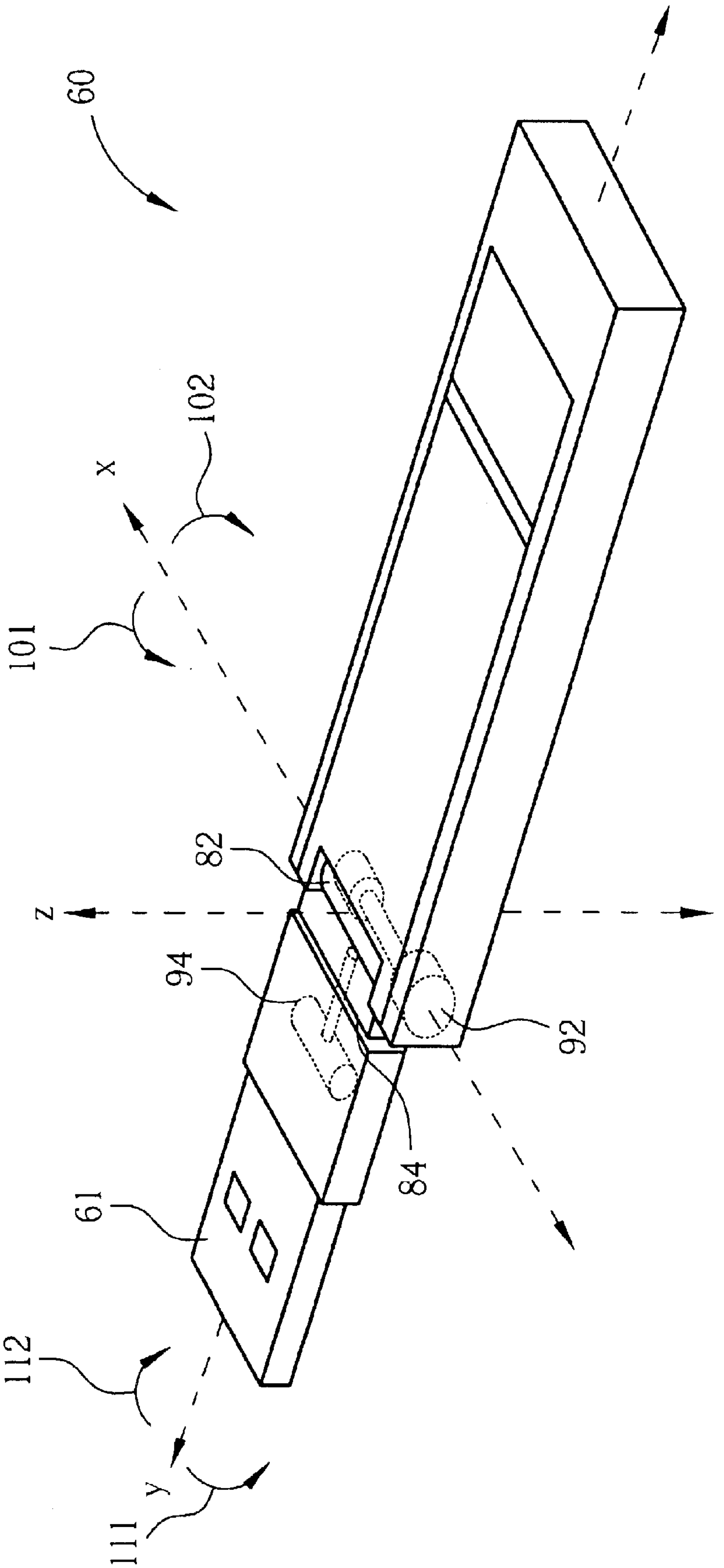
FIG. 6, FIG. 7, and FIG. 8 show perspective, top, and side views of the WLAN stick, respectively.
Figure 7:
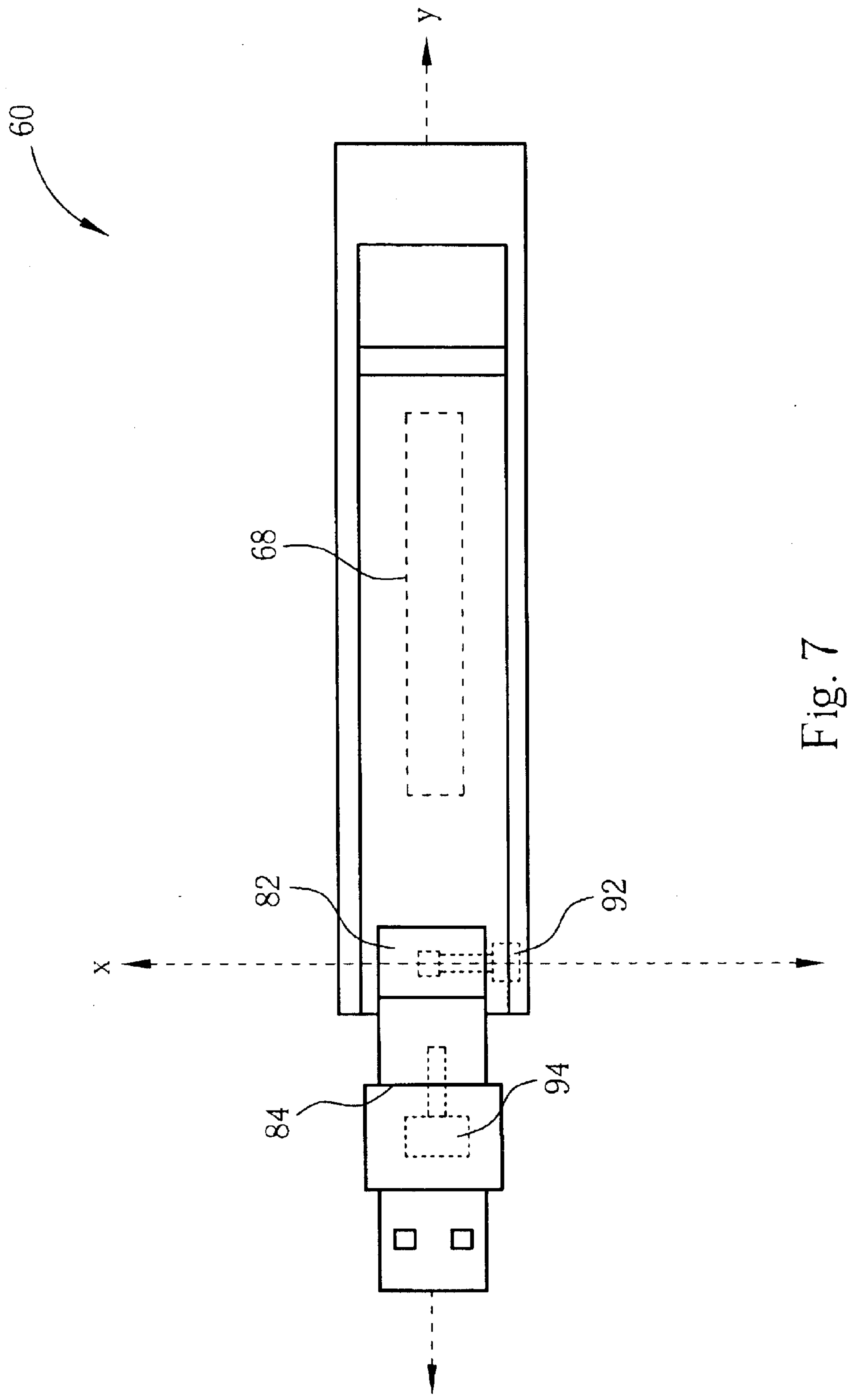
Figure 8:
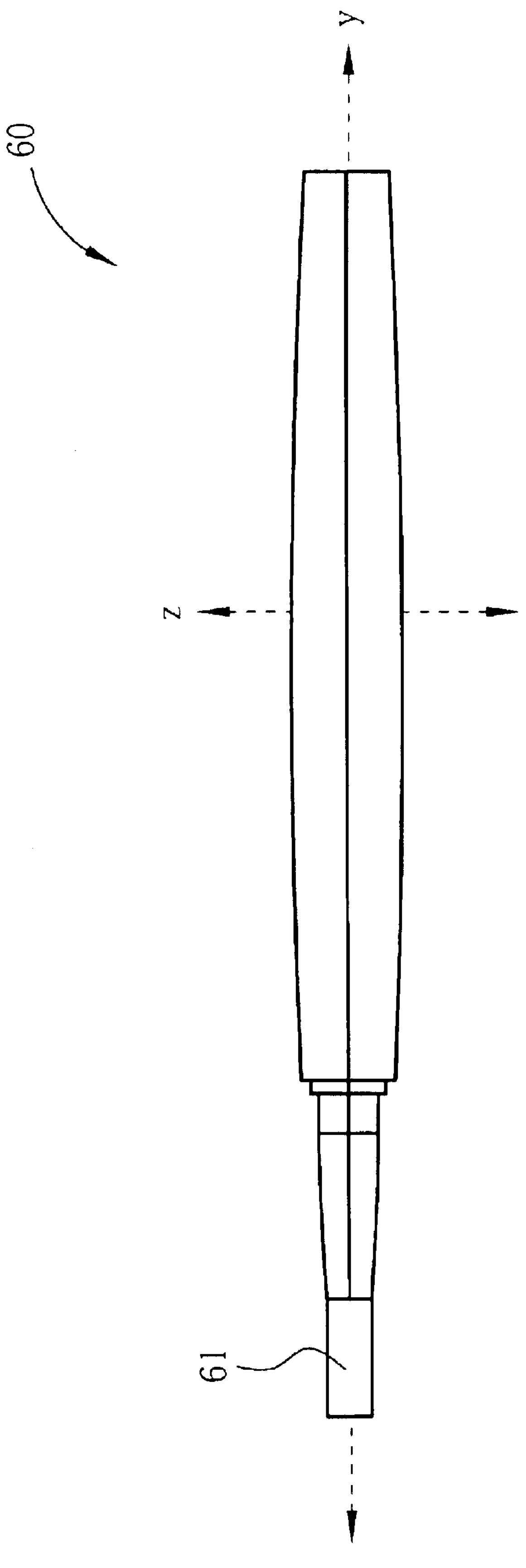

Please refer to FIG. 5 through FIG. 8. FIG. 5 is a functional block diagram of a WLAN stick 60 connected to a host computer 55 according to the present invention. FIG. 6, FIG. 7, and FIG. 8 show perspective, top, and side views of the WLAN stick 60, respectively. The WLAN stick 60 connects with the host computer 55 through a connector 61 formed on one end of the WLAN stick 60. In the preferred embodiment of the present invention, the connector 61 is a USB connector, but other connectors such as IEEE 1391 and PCMCIA connectors are also within the scope of the present invention. Also, the host computer 55 may be a notebook computer, a desktop computer, or any other computing device that can communicate with a WLAN.

Figure 1:
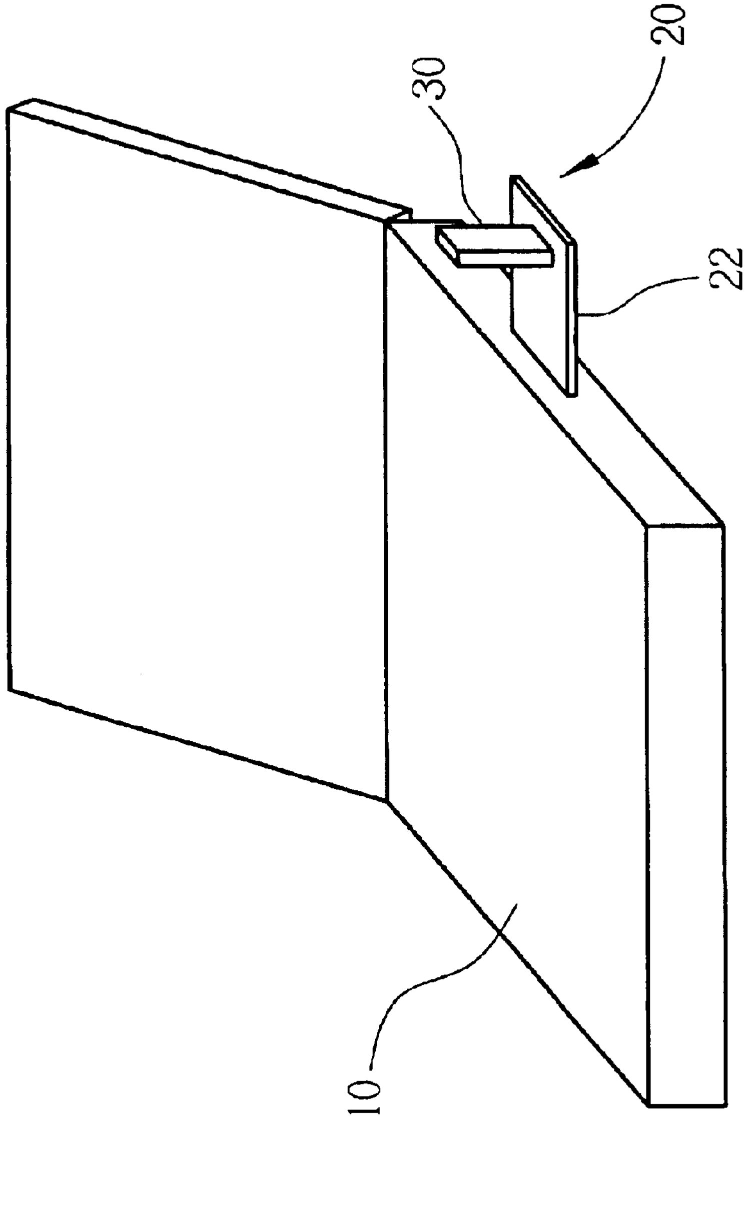
Fig. 1 Prior Art
FIG. 1 is a diagram of a host computer connected to a WLAN according to the prior art.
Figure 2:
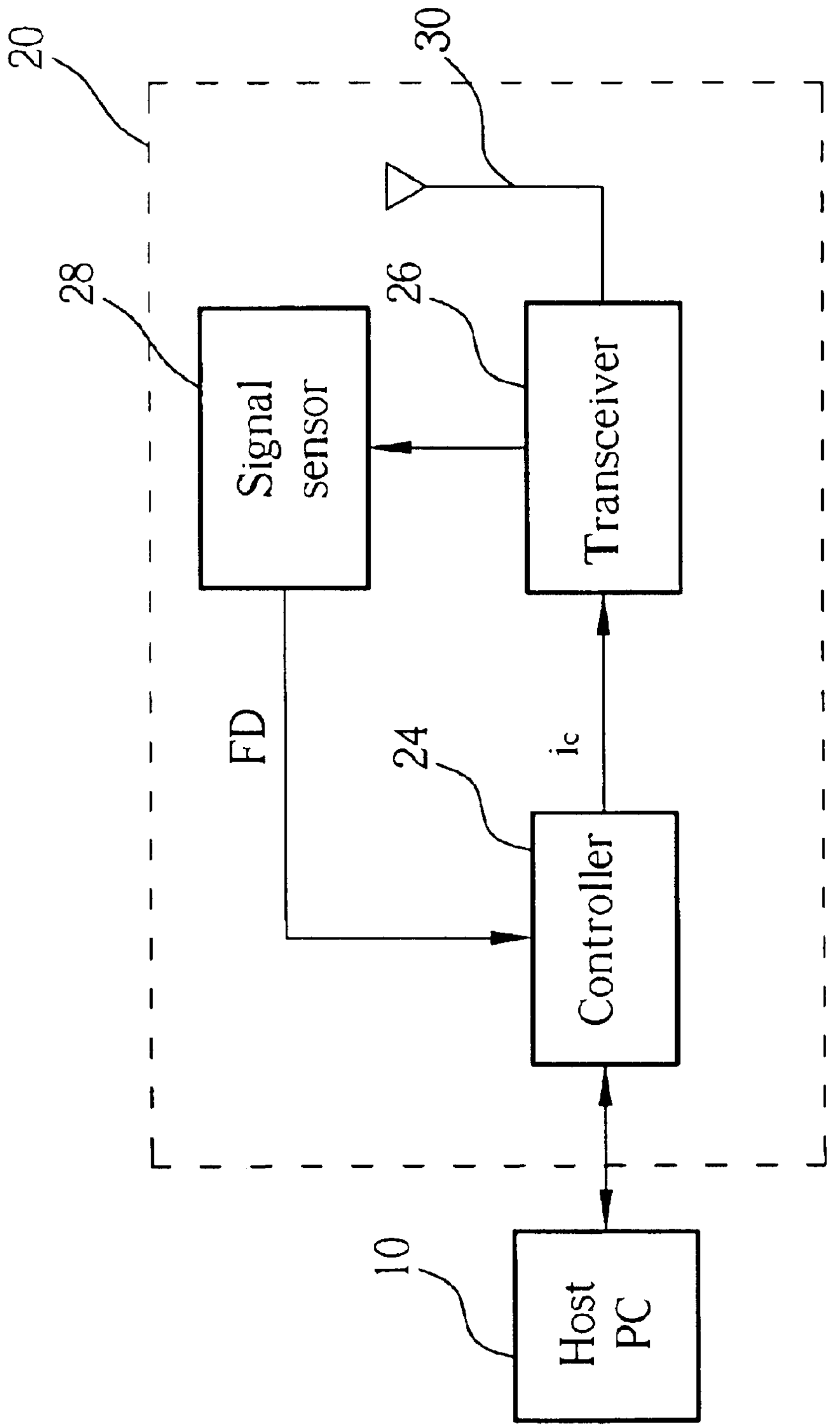
Fig. 2 Prior Art
FIG. 2 is a functional block diagram of a wireless communication card connected to the host computer according to the prior art.

Like the prior art wireless communication card 20 shown in FIG. 2, the WLAN stick 60 contains a transceiver 66 electrically connected to an antenna 68 for transmitting and receiving wireless signals through the antenna 68. A signal sensor 64 is electrically connected to the transceiver 66 for detecting strength of wireless signals received by the WLAN stick 60. The signal sensor 64 will output a feedback signal FD to a controller 62 for notifying the controller 62 of the strength of the received wireless signals.

Different from the prior art wireless communication card 20, the WLAN stick 60 of the present invention contains a first motor 92 and a second motor 94, each of which is controlled by the controller 62. The first motor 92 rotates the WLAN stick 60 along a first hinge 82 for rotating the WLAN stick 60 about the x-axis. Therefore, the first motor 92 can rotate the WLAN stick 60 in the directions shown by arrows 101 and 102. Likewise, the second motor 94 rotates the WLAN stick 60 along a second hinge 84 for rotating the WLAN stick 60 about the y-axis in the directions shown by arrows 111 and 112. The first and second motors 92 and 94 are preferably step motors or DC motors.

The controller 62 controls the first motor 92 and the second motor 94 to rotate the WLAN stick 60 in three main situations: when the WLAN stick 60 is initially inserted into the host computer 55, during a periodic signal scan, and when the feedback signal FD received from the signal sensor 64 indicates that the signal strength is low. These three situations serve only as examples, and are not intended to limit the scope of the present invention. As shown in FIG. 7, the antenna 68 is formed in an upper portion of the WLAN stick 60 above the first hinge 82 and the second hinge 84, for allowing the antenna 68 to be rotated about the x-axis and y-axis. By rotating the antenna 68 about the x-axis and y-axis, the WLAN stick 60 can always achieve optimum signal strength for both transmission and reception of wireless signals.

Figure 9:
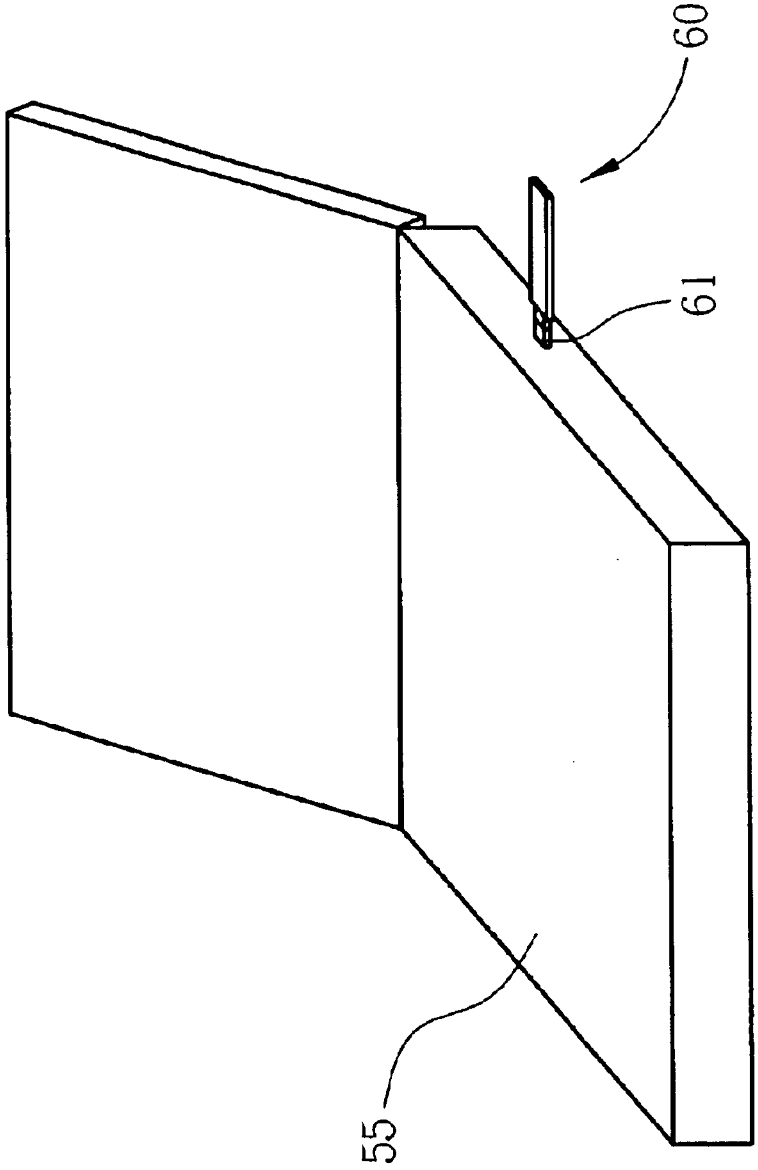
FIG. 9 shows the WLAN stick being inserted into the host computer.
Figure 10:
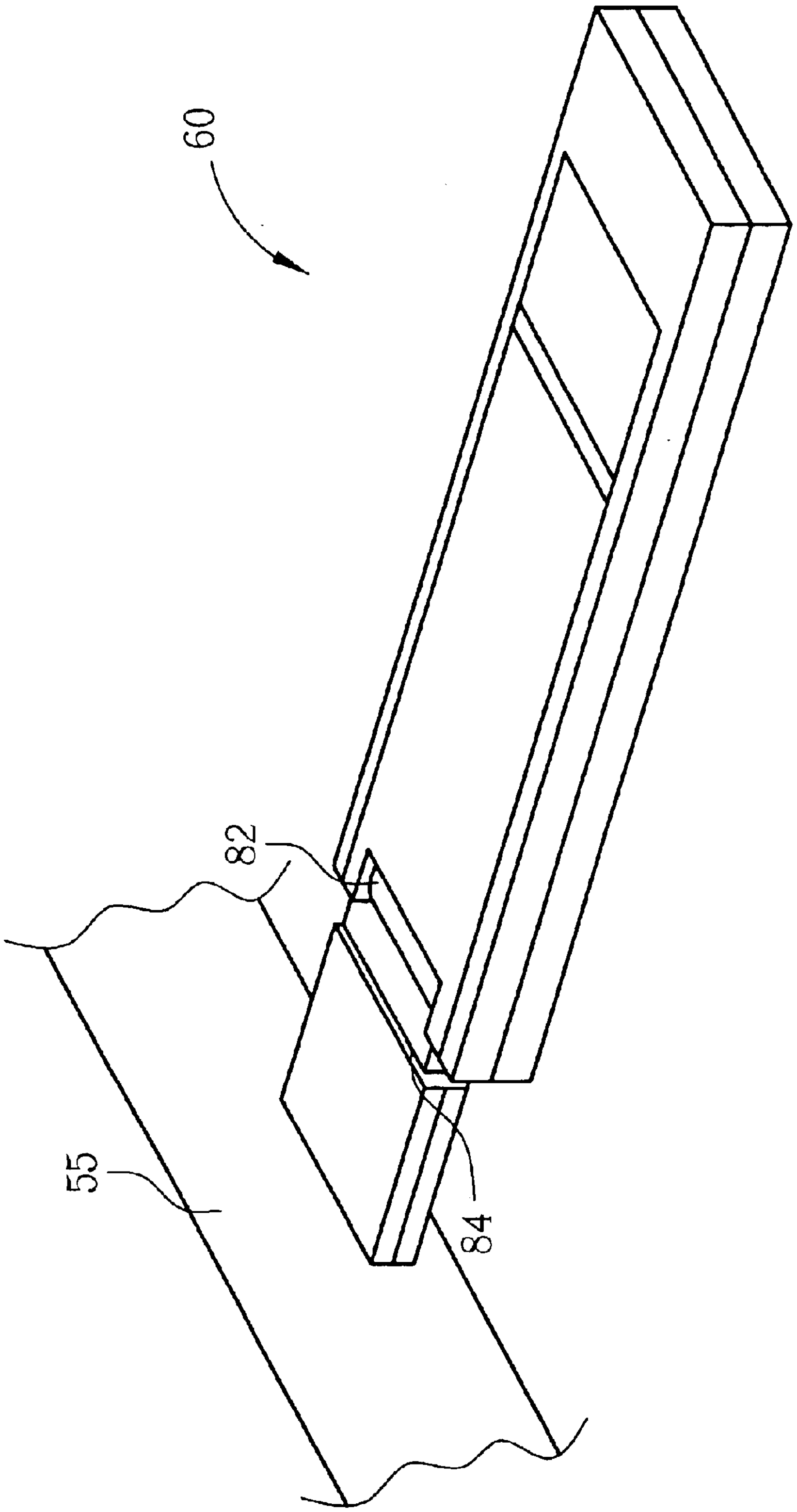
FIG. 10 through FIG. 13 shows the WLAN stick being rotated along first and second hinges.

Please refer to FIG. 9 through FIG. 13. FIG. 9 shows the WLAN stick 60 being inserted into the host computer 55. FIG. 10 through FIG. 13 shows the WLAN stick 60 being rotated along the first and second hinges 82 and 84. In FIG. 9, the connector 61 of the WLAN stick 60 is inserted into the host computer 55 for allowing the host computer 55 to communicate with the WLAN through the WLAN stick 60. FIG. 10 shows the WLAN stick 60 after insertion into the host computer 55. As shown in FIG. 9 and FIG. 10, the WLAN stick 60 is roughly parallel with a surface that the host computer 55 is placed on. For improving the transmission and reception signal strength, the WLAN stick 60 may be rotated along the first hinge 82 and the second hinge 84.

Figure 11:
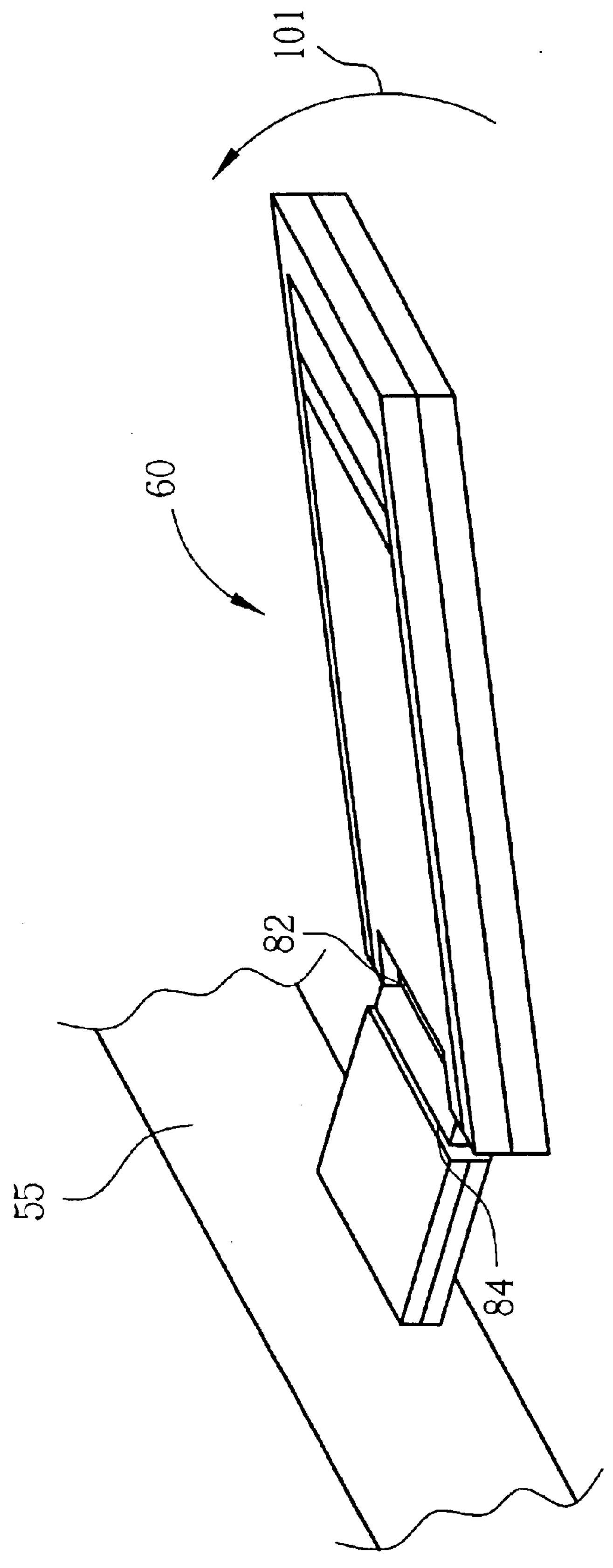
Figure 12:
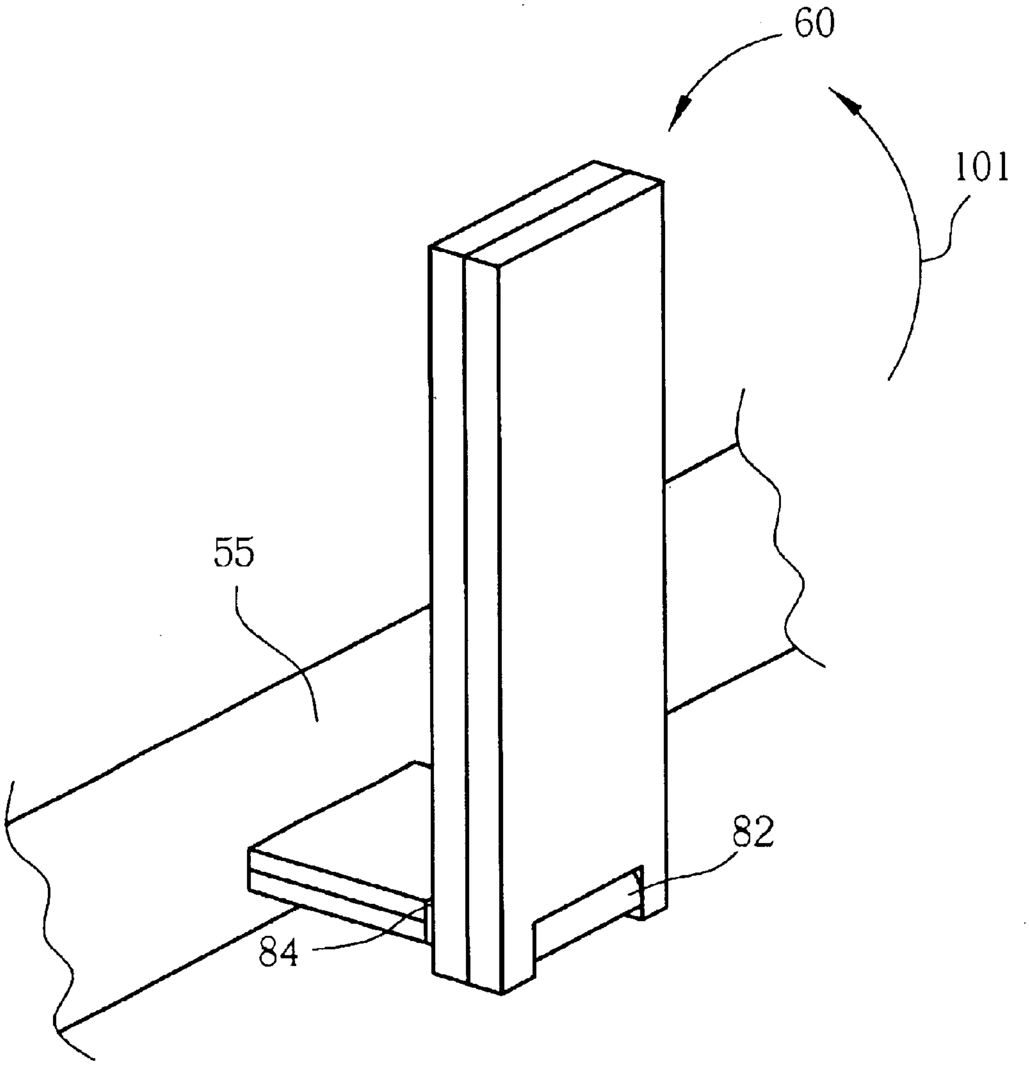
Figure 13:
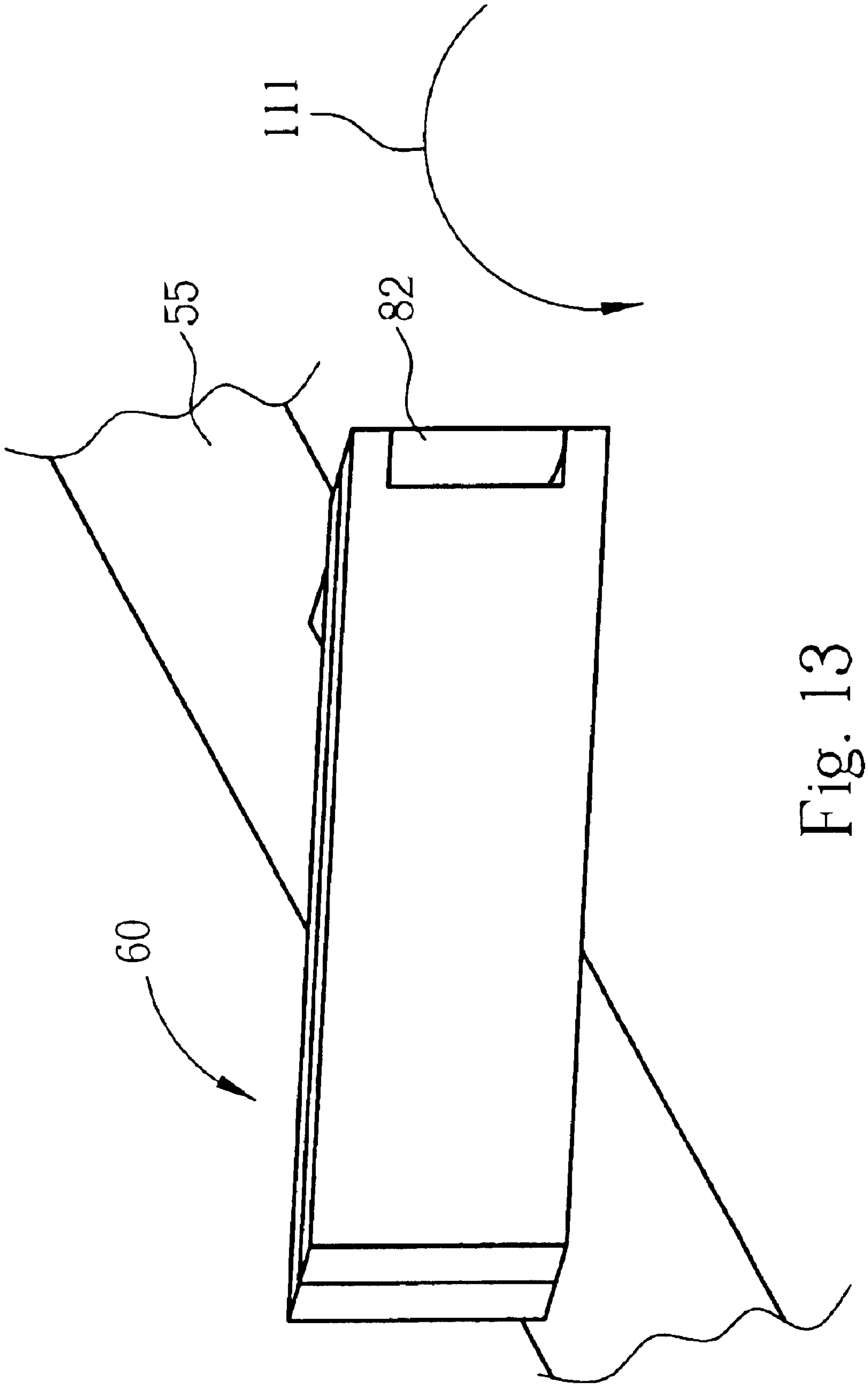

FIG. 11 shows the WLAN stick 60 after being rotated along the first hinge 82 by a small angle in the direction shown by arrow 101. FIG. 12 shows the WLAN stick 60 after being further rotated along the first hinge 82 in the direction shown by arrow 101. At this point, the WLAN stick 60 is roughly perpendicular to the surface that the host computer 55 is placed on. FIG. 13 shows the WLAN stick 60 after being rotated along the second hinge 84 by a small angle in the direction shown by arrow 111. Although FIG. 11 through FIG. 13 show the WLAN stick 60 being rotated in only one direction at a time, it is also possible to rotate the WLAN stick 60 about the x-axis and y-axis at the same time.

Figure 14:
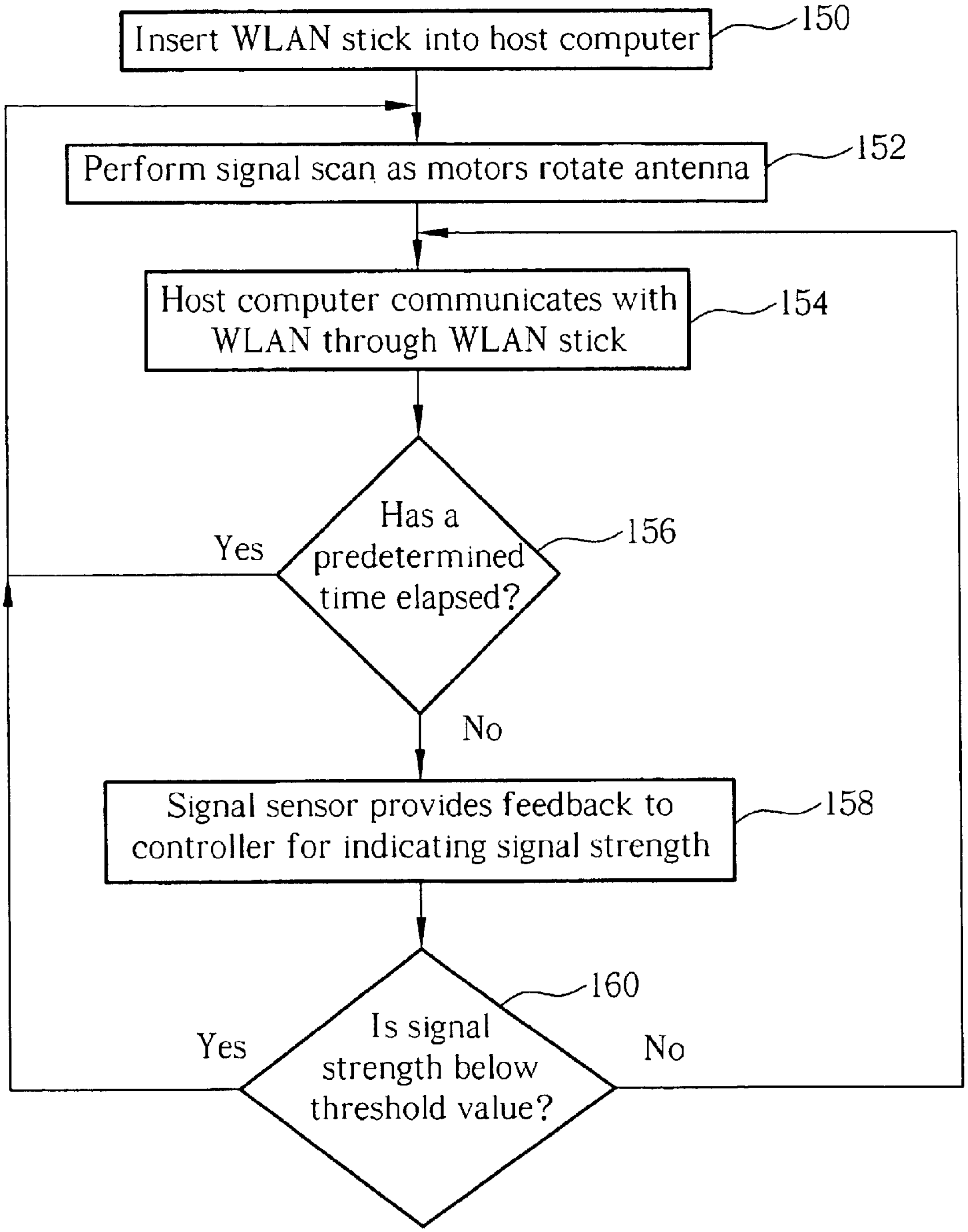
FIG. 14 is a flowchart illustrating scanning wireless signals with the present invention WLAN stick.

Please refer to FIG. 14. FIG. 14 is a flowchart illustrating scanning wireless signals with the present invention WLAN stick 60. Steps contained in the flowchart will be explained below.

Step 150: Insert the WLAN stick 60 into the host computer 55;

Step 152: Perform a signal scan process while the first and second motors 92 and 94 rotate the WLAN stick 60 for determining which position of the WLAN stick 60 provides optimal signal strength;

Step 154: The host computer 55 communicates with the WLAN through the WLAN stick 60;

Step 156: Determine if a predetermined time has elapsed; if so, the WLAN stick 60 should do a periodic signal scan, go to step 152; if not, go to step 158;

Step 158: The signal sensor 64 provides the feedback signal FD to the controller 62 for indicating the strength of transmitted and received signals; and Step 160: Determine if the signal strength is below a threshold value; if so, the WLAN stick 60 should perform another signal scan, go to step 152; if not, go to step 154.

Figure 3:
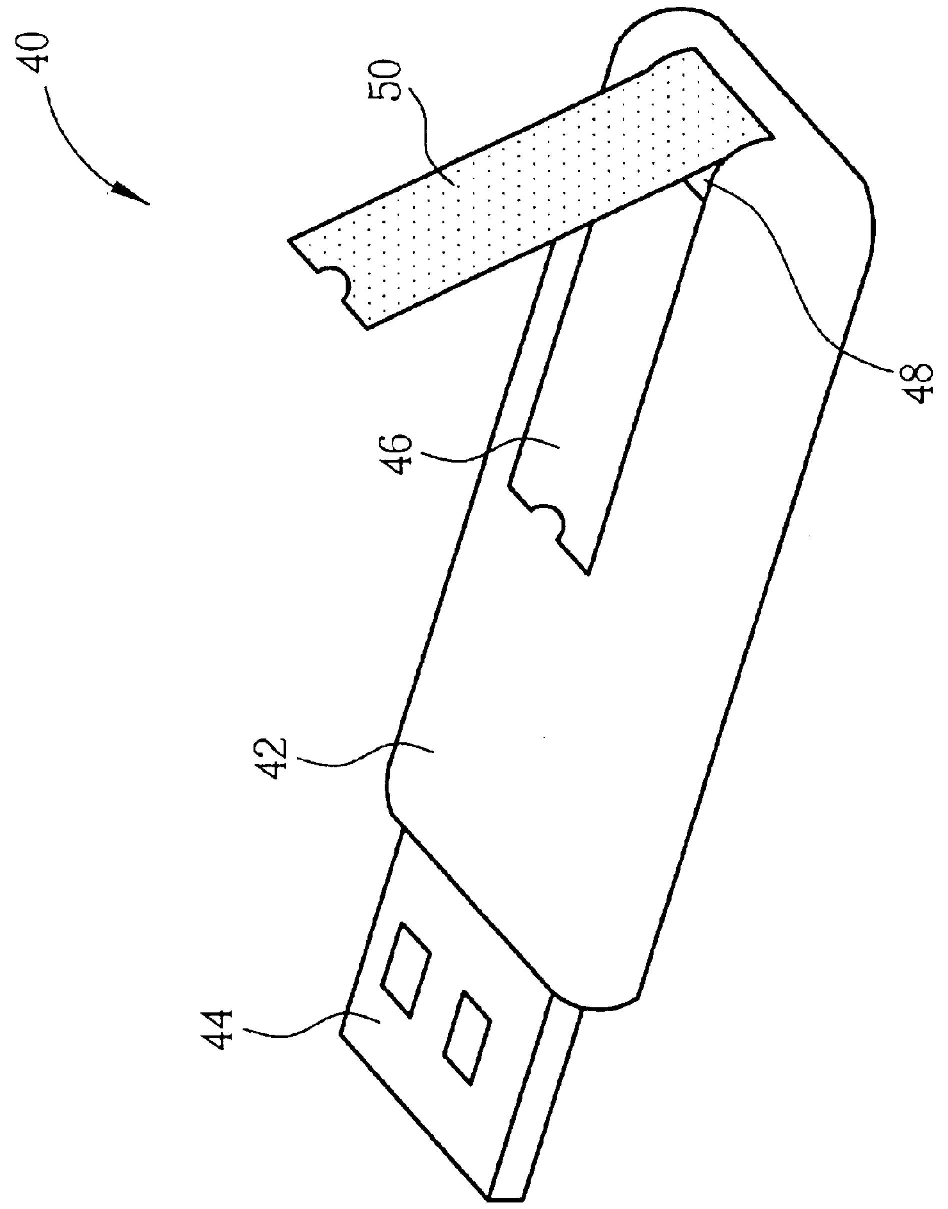
Fig. 3 Prior Art
FIG. 3 and FIG. 4 are perspective diagrams of a WLAN stick according to the prior art.
Figure 4:
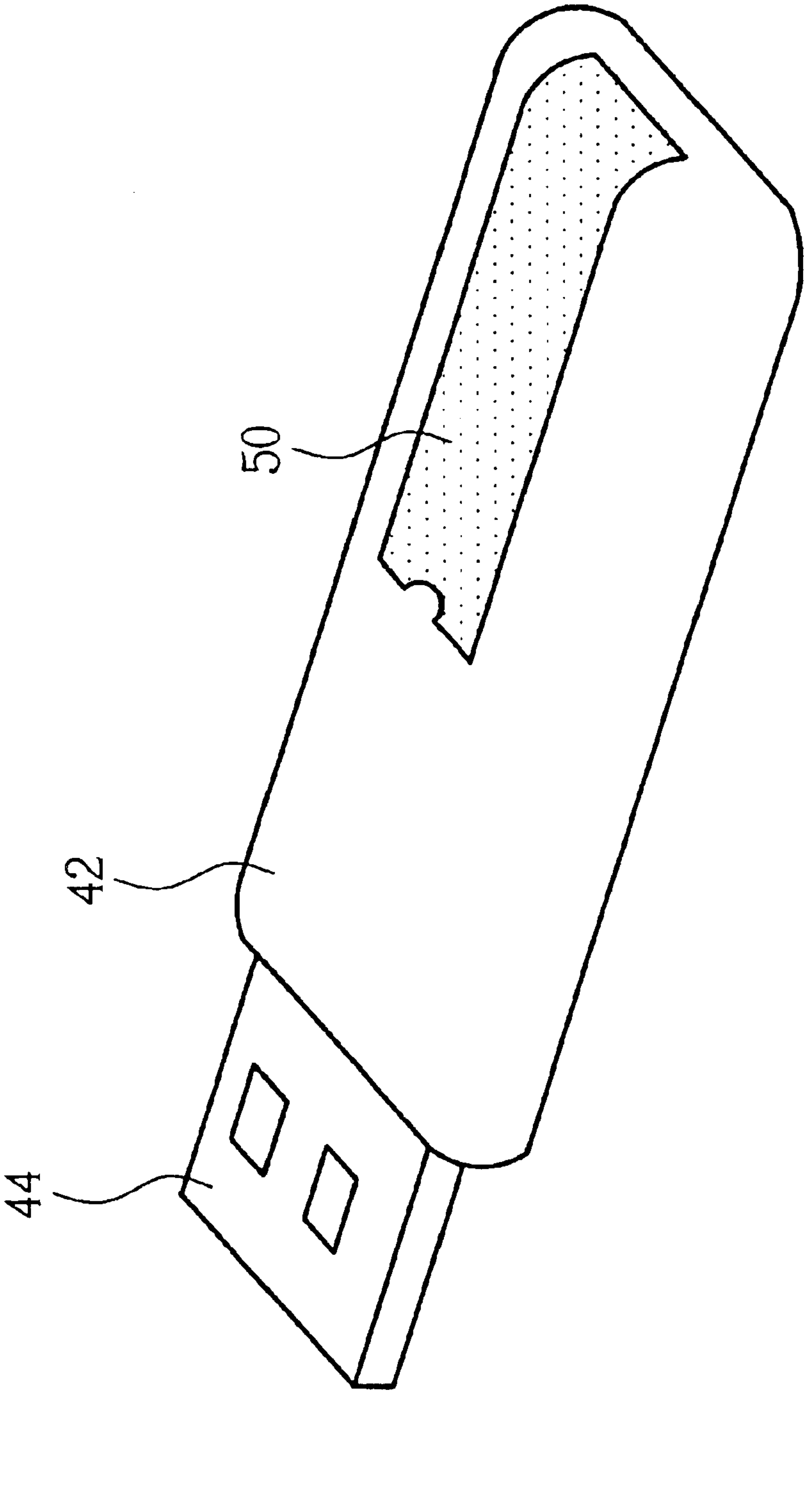
Fig. 4 Prior Art

Compared to the prior art WLAN stick 40 shown in FIG. 3, the present invention WLAN stick 60 is capable of using motors to automatically rotate the WLAN stick 60 about two axes for maintaining optimal transmission and reception signal strength. The WLAN stick 60 is automatically rotated during a scanning process, eliminating the need for a user to manually adjust the angle of the antenna. Therefore, even if the user decides to move the host computer 55 to a different location, the WLAN stick 60 can still maintain a reliable connection with the WLAN.

The controller 62 may also integrate with a vibration detection circuit (like the vibration responsive circuit shown in U.S. Pat. No. 4,974,850) to detect the vibration generated when the user is moving the host computer 55 to a different location. Therefore, even the WLAN stick 60 is always inserted in the host computer 55, when the host computer 55 is moved to the new location and the vibration stops, the controller 62 will automatically trigger the WLAN stick 60 to perform the step 152 rotation and scanning process.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A wireless communication device comprising:

a housing;

an antenna;

a transceiver for transmitting and receiving wireless signals through the antenna;

a first hinge connecting the antenna to the housing for allowing the antenna to rotate about a first axis with respect to the housing;

a first motor for rotating the antenna about the first axis with respect to the housing; and a control circuit for controlling the first motor to rotate the antenna for scanning reception of wireless signals as the antenna is rotated at different angles.

2. The wireless communication device of claim 1 wherein the antenna comprises a second hinge for allowing the antenna to rotate about a second axis with respect to the housing.

3. The wireless communication device of claim 2 wherein the second axis is perpendicular to the first axis.

4. The wireless communication device of claim 2 further comprising a second motor for rotating the antenna about the second axis with respect to the housing.

5. The wireless communication device of claim 1 being capable of electrically connecting to a host device for allowing the host device to send and receive wireless signals through the wireless communication device.

6. The wireless communication device of claim 5 wherein the host device communicates with a wireless local area network (WLAN) through the wireless communication device.

7. The wireless communication device of claim 5 further comprising a USB interface to enable connection with the host device.

8. The wireless communication device of claim 5 wherein the host device is a notebook computer.

9. The wireless communication device of claim 1 further comprising a signal sensor for measuring the strength of received signals, wherein the control circuit controls the first motor to change the angle of the antenna according to the signal strength measured by the signal sensor.

10. The wireless communication device of claim 1 wherein the housing comprises an upper housing and a lower housing, the upper housing being rotatably connected to the lower housing at the first hinge, and the antenna is disposed on the upper housing for changing an angle of the antenna as the upper housing is rotated by the first motor.

* * * * *